(12) United States Patent
Oyanagi

(10) Patent No.: US 7,099,021 B2
(45) Date of Patent: Aug. 29, 2006

(54) MULTIFUNCTION PRINTER

(75) Inventor: Makoto Oyanagi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 851 days.

(21) Appl. No.: 10/075,989

(22) Filed: Feb. 15, 2002

(65) Prior Publication Data

US 2002/0114001 A1 Aug. 22, 2002

(30) Foreign Application Priority Data

Feb. 20, 2001 (JP) ............................ P.2001-043487
Dec. 14, 2001 (JP) ............................ P.2001-381409

(51) Int. Cl.
*G06F 15/00* (2006.01)

(52) U.S. Cl. ...................... 358/1.13; 358/1.15; 358/296

(58) Field of Classification Search ................ 358/1.1, 358/1.5, 1.12, 1.13, 1.14, 1.15, 296

See application file for complete search history.

(56) References Cited

U.S. PATENT DOCUMENTS 6,804,017 B1 * 10/2004 Itoh ............................ 358/1.14
6,871,243 B1 * 3/2005 Iwase et al. ................. 710/62

FOREIGN PATENT DOCUMENTS

| JP | 08-006745 | 1/1996 |
| JP | 08-072362 | 3/1996 |

* cited by examiner

*Primary Examiner*—Mark Wallerson
(74) *Attorney, Agent, or Firm*—Mattingly, Stanger, Malur & Brundidge, P.C.

(57) ABSTRACT

In a multifunction printer having a scanner section and a printer section in one piece, upon reception of a printer section reset command, an interface control task forcibly writes NULL into an input buffer and a job control task sets a reset flag RSF. Various nested loop processes are executed in a main task. Since NULL is stored in the input buffer, the process is terminated in due time and since the reset flag RSF is set, control gradually returns to the main loop process. Thus, if the scanner section and the printer section operate concurrently, the main task can be initialized and only the printer section can be reset.

13 Claims, 13 Drawing Sheets

MULTIFUNCTION PRINTER

The present application is based on Japanese Patent Applications No. 2001-043487 and 2001-381409, which are incorporated herein by reference.

BACKGROUND OF THE INVENTION

1. Field of the Invention

This invention relates to a multifunction printer having a scanner section and a printer section and in particular to a multifunction printer having a scanner section and a printer section that can operate independently of each other.

2. Description of the Related Art

A multifunction printer having a scanner section and a printer section which are integral and are stored in one cabinet becomes widespread. Such a multifunction can act as a scanner, a printer, and a copier. In this case, to make it possible to execute color print and a color copy, often a color ink jet printer is used as the printer section.

With such a multifunction, the user might want to cancel a print job being executed in the printer section for some reason. To do this, the user transmits a reset command from a computer connected to the multifunction printer thereto and the multifunction printer cancels the print job being executed based on the reset command.

However, in the multifunction printer in the related art, to cancel the print job being executed, reboot processing is executed to restore various tasks operating to execute the print to the initial state. That is, the various tasks in the multifunction printer operate in a real-time operating system (OS) and thus the real-time OS itself is rebooted, whereby the multifunction printer is initialized and the print job being executed is canceled.

However, a multifunction printer comprising a scanner section that can operate independently of a printer section is also available. In such a multifunction printer, while the printer section prints print data received from the computer connected to the multifunction printer, the scanner section can perform the scan operation over an original, etc., concurrently. If the real-time OS itself is rebooted while the concurrent operation is thus performed, the scanner section is also reset although the user does not intend to reset the scanner section.

Moreover, if the user makes a retry of scanning and transmits a command from the computer to the multifunction printer, a communication error may be caused to occur because the real-time OS is already rebooted. In this case, the user must again start up the scanner driver of the computer and remove the communication error.

SUMMARY OF THE INVENTION

It is therefore an object of the invention to make it possible to cancel only the print operation of a printer section in a multifunction printer having the printer section and a scanner section.

To the end, according to the invention, there is provided a multifunction printer having a scanner section and a printer section, characterized by reset means for resetting only the printer section even if the scanner section is operating. Thus, even if the scanner section and the printer section operate concurrently, it is made possible to reset only the printer section.

In this case, the multifunction printer may further comprise reception means for a printer section reset command for resetting the printer section, wherein upon reception of the printer section reset command, the reset means may reset only the printer section. This enables the user to reset the print section by transmitting the printer section reset command from the computer connected to the multifunction printer.

Further, in this case, the multifunction printer may comprise only one central processing unit.

Further, the reset means may be realized by the central processing unit which executes at least a first task, upon reception of the printer section reset command, for writing dummy data interpreted as insignificant data as print data into an input buffer for storing print data transmitted from the computer as print data, and a second task for reading the print data stored in the input buffer and expanding the data into image data. The dummy data is thus stored in the input buffer, whereby even if the second task for reading the print data from the input buffer and expanding the data into image data terminates the expansion processing sometime regardless of what operation is performed.

The reset means may further comprise as a task executed by the central processing unit, a third task, upon reception of the printer section reset command, for setting reset identification information indicating that the printer section is being reset. Accordingly, the reset identification information is checked, whereby it is made possible for each task to recognize that the printer section is being reset at the point in time.

The second task may have the highest-order main loop process and a low-order loop process deriving in a nested loop manner from the main loop process and when the reset identification information is set, the low-order loop process may exit the process and returns to the high-order loop process. Thus, if the printer section is being reset, the second task exits the low-order loop processes contained therein in order and makes the transition to the higher-order loop process and finally can return to the highest-order main loop process.

Further, when the current mode is a character mode for printing character data, the second task performs processing for determining whether or not the dummy data occurs continuously a predetermined number of times or more and when the current mode is a graphic mode for printing graphic data, the second task may skip the determination processing. Thus, degradation of the throughput in the character mode in which the same print data as the dummy data easily occurs can be suppressed.

On the other hand, the multifunction printer according to the invention may further comprise data expansion processing means for expanding received print data, when the reset means receives the printer section reset command, the data expansion processing means for terminating expanding the print data in progress, and low-order processing means being started by the data expansion processing means, when a predetermined time has elapsed since the low-order processing means was started, the low-order processing means returning to the data expansion processing means if the processing does not terminate. In doing so, it is made possible to reset only the print section without writing dummy data as described above.

The multifunction printer according to the invention may further comprise print engine initialization means for restoring a print engine to the initial state if expanding the print data by the data expansion processing means terminates in progress. In this case, after the print engine initialization means restores the print engine to the initial state, the setup state of the data expansion processing means may be restored to the initial state.

The invention can also be interpreted as a control method for realizing a multifunction printer as described above and can also be interpreted as a program for the purpose and a record medium recording the program.

Features and advantages of the invention will be evident from the following detailed description of the preferred embodiments described in conjunction with the attached drawings.

DETAILED DESCRIPTION OF THE PREFERRED EMBODIMENTS

In the invention, involved tasks are notified that a printer section reset command for resetting only a printer section has been received, and dummy data insignificant for interpreting print data is continuously written into an input buffer for storing the print data so that various tasks involved in print processing can exit the current processing being performed. Accordingly, the various complicated tasks involved in the print processing can exit themselves the current processing being performed and only the printer section can be reset. A first embodiment of the invention will be discussed in detail.

Figure 1:
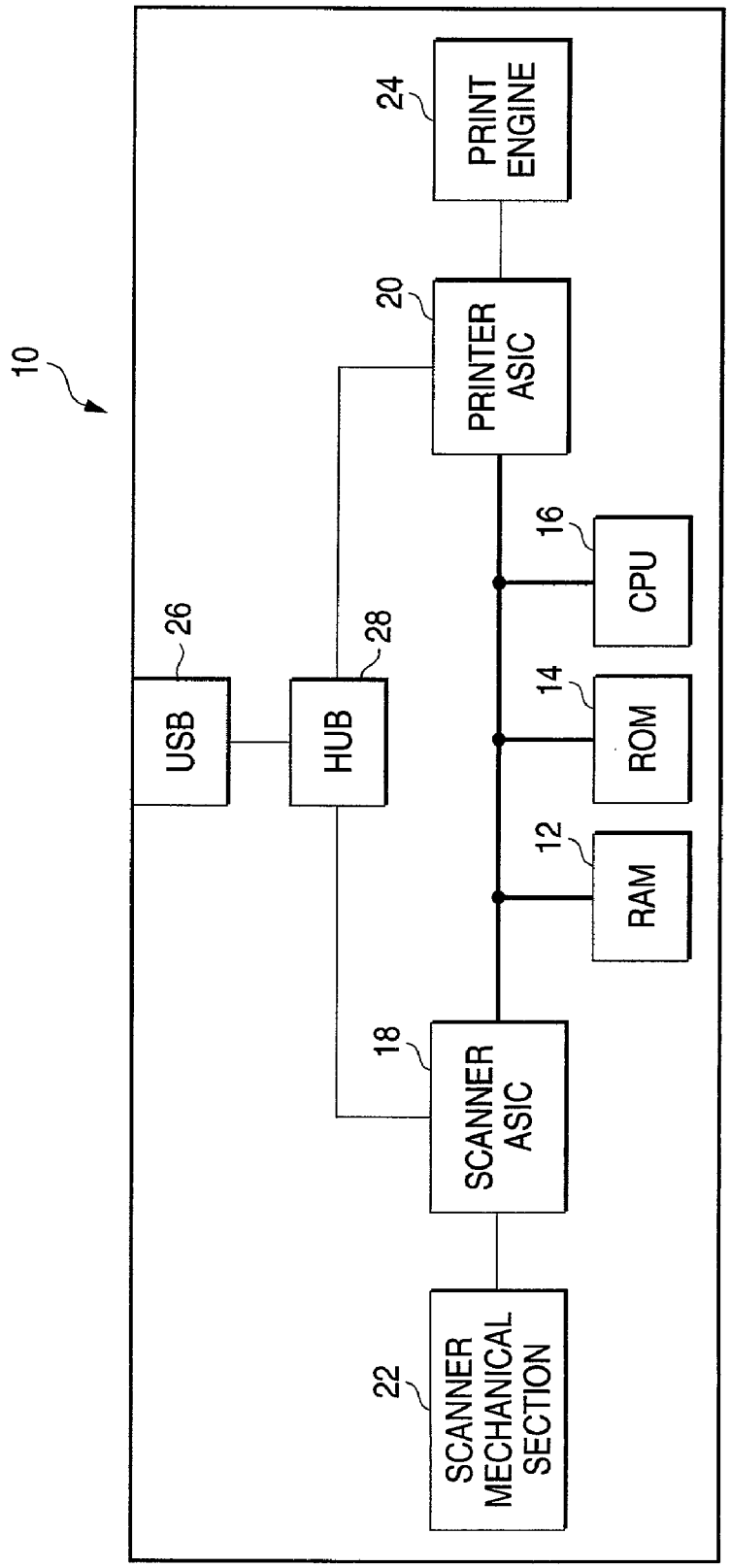
FIG. 1 is a block diagram to show the internal configuration of a multifunction printer according to a first embodiment of the invention.

To begin with, the internal configuration of a multifunction printer 10 according to the embodiment will be discussed with reference to FIG. 1. FIG. 1 is a block diagram to show the internal configuration of the multifunction printer 10 comprising a scanner section and a printer section in one piece.

As shown in FIG. 1, the multifunction printer 10 comprises RAM (random access memory) 12, ROM (read-only memory) 14, a CPU (central processing unit) 16, a scanner ASIC (application-specific integrated circuit) 18, and a printer ASIC 20, these components being connected to each other by an internal bus. As understood from the fact, the multifunction printer 10 according to the embodiment is provided with only one CPU.

A scanner mechanical section 22 for performing the actual scan operation is connected to the scanner ASIC 18. A print engine 24 for performing the actual print operation is connected to the printer ASIC 20.

The multifunction printer 10 further comprises a USB (universal serial bus) port 26 connected to a computer by a USB cable. This USB port 26 is connected to a USB hub 28, which then is connected to the scanner ASIC 18 and the printer ASIC 20. Therefore, data and a command transmitted from the computer are input through the USB hub 28 to both the scanner ASIC 18 and the printer ASIC 20.

For example, print data transmitted from the computer to the multifunction printer 10 is received at the printer ASIC 20 and is stored in an input buffer formed in the RAM 12. The print data stored in the input buffer is expanded into image data in sequence and is printed by a print engine 24 through the printer ASIC 20. The print engine 24 according to the embodiment has a color ink jet head and this head is mounted on a carriage and the carriage is moved alternately in the main scanning direction, whereby color print is made possible.

On the other hand, the scanner mechanical section 22 has a line image sensor for optically reading an original. This line image sensor is mounted on a carriage and the carriage is moved from one end side of the original to an opposite end side, whereby the whole original can be read. This read operation is controlled by the scanner ASIC 18 and the read scan data is stored in a scanner buffer formed in the RAM 12.

In the multifunction printer 10 according to the embodiment, the scan operation in the scanner mechanical section 22 forming a part of the scanner section and the print operation in the print engine 24 forming a part of the printer section can be executed concurrently. For example, while the scanner mechanical section 22 is performing the scanning operation over an original, the print engine 24 can sequentially print the print data transmitted from the computer. In the multifunction printer 10 according to the embodiment, only the printer section can be reset (print job can be canceled) in a state in which the scanner section and the printer section are operating concurrently.

Figure 2:
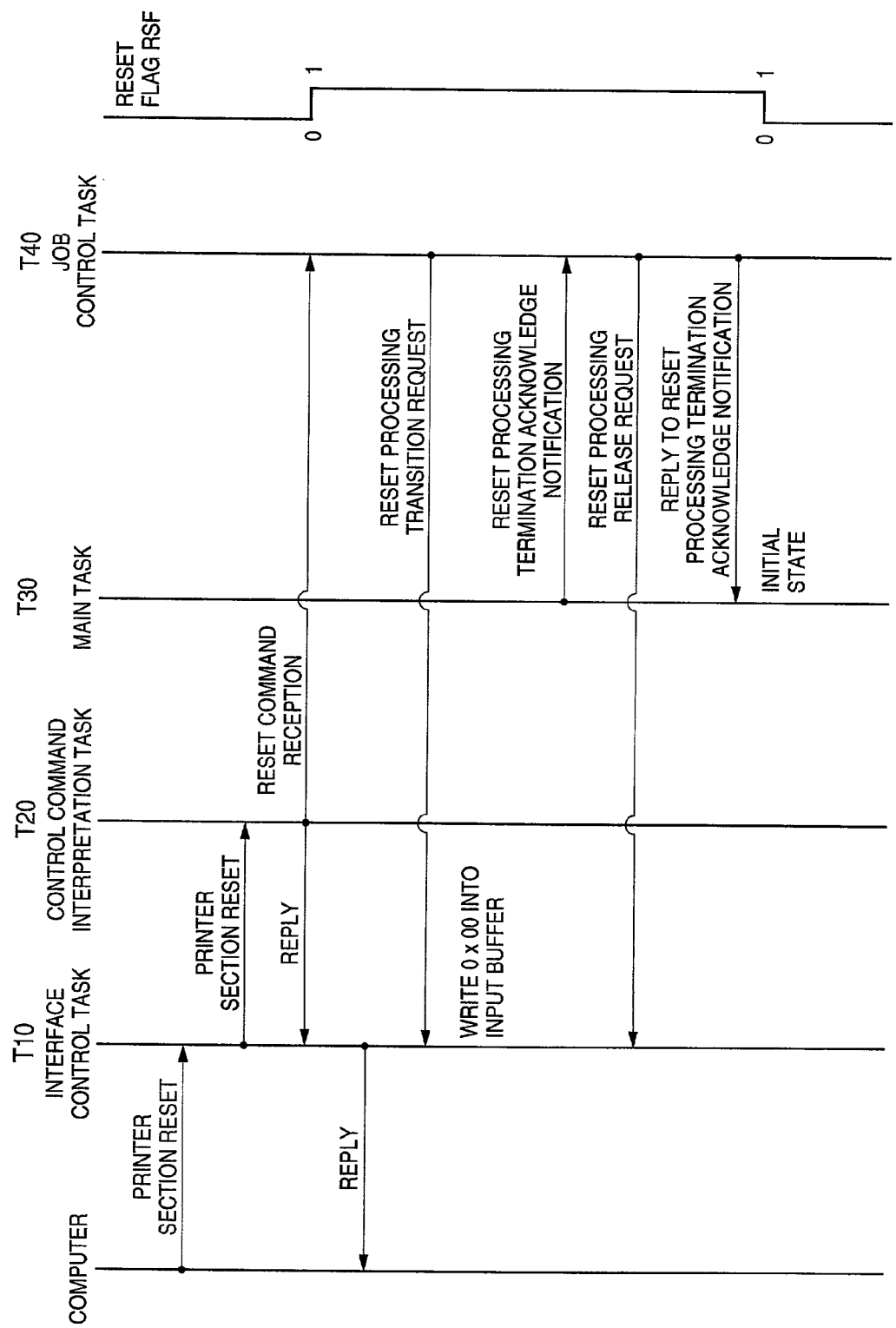
FIG. 2 is a timing chart to schematically describe processing of the multifunction printer according to the first embodiment of the invention upon reception of a printer section reset command from a computer.

The general processing flow of resetting only the printer section will be discussed with reference to FIG. 2. FIG. 2 is a timing chart to describe processing of the multifunction printer 10 upon reception of a printer section reset command for resetting the printer section and continuing the operation of the scanner section from the computer.

As shown in FIG. 2, the multifunction printer 10 according to the embodiment comprises an interface control task T10, a control command interpretation task T20, a main task T30, and a job control task T40. Although the multifunction printer 10 comprises other tasks, only the tasks involved in the embodiment are shown. The tasks are managed in the real-time OS installed in the multifunction printer 10 and are executed by the CPU 16.

To begin with, to cancel the print job being executed, the user transmits a print section reset command from the computer to the multifunction printer 10. The print section reset command is received by the interface control task T10. The interface control task T10 determines whether the received command is a control command or print data, etc. In this example, the received command is a control command and therefore the interface control task T10 transmits the command to the control command interpretation task T20 to request the control command interpretation task T20 to interpret the print section reset command.

Upon reception of the command, the control command interpretation task T20 interprets the command, whereby the received command is determined the print section reset command. Thus, the control command interpretation task T20 requests the interface control task T10 to send a reply. Based on the request, the interface control task T10 returns a reply to the computer. The control command interpretation task T20 transmits a reset command reception message to the job control task T40.

Upon reception of the reset command reception message, the job control task T40 sets a rest flag RSF and transmits a reset processing transition request to the interface control task T10. The job control task T40 discards the later jobs of print, paper feed request, etc., thoroughly. However, to a message requiring a response, only a necessary reply is made for the present.

Upon reception of the reset processing transition request, the interface control task T10 writes dummy data of 0x00 (hexadecimal number 00) into all area of the input buffer for storing the print data, and notifies a reception data management task that the data has arrived.

When the printer section is printing, the main task T30 performs various loop processes. A predetermined command indicating the data amount is added to the top of the print data and the reception data management task continues to stand by until reception of the data amount added to the command. To terminate the standby state, it is necessary to at least receive the data amount added to the command. Then, in the embodiment, 0x00, namely, insignificant NULL data not normally existing as a command is written in the data amount satisfying at least the data amount added to the command, thereby terminating the standby state. Accordingly, reset processing is made possible without confusing the command with any other command.

If the input buffer becomes empty of the print data to be acquired in the main task, a print data acquisition request is issued via the reception data management task (not shown) to the interface control task T10. Also in this case, the interface control task T10 writes dummy print data of 0x00 into the input buffer and notifies the reception data management task that the data has arrived.

Thus, the main task T30 acquires only the NULL data and therefore can exit low-order loop processing sometime and return to the highest-order loop processing of the main task T30. When returning to the highest-order loop processing, the main task T30 transmits a reset processing termination acknowledge notification to the job control task T40 and notifies the job control task T40 that the main task 30 has returned to the highest-order loop processing.

Upon reception of the reset processing termination acknowledge notification, the job control task T40 resets the reset flag RSF and stops discarding the jobs of print, a paper feed request, etc. It also transmits a reset processing release request to the interface control task T10. Accordingly, the interface control task T10 is restored from the reset processing mode to the normal print data reception mode. On the other hand, the job control task T40 sends a replay to the reset processing termination acknowledge notification to the main task T30. When the reply is returned to the main task T30, the main task T30 restores the necessary setup state to the initial state. Resetting only the printer section is now complete.

The processing of the multifunction printer 10 upon reception of the printer section reset command has been schematically described. Next, the detailed processing contents of each of the tasks described above will be discussed.

Figure 3:
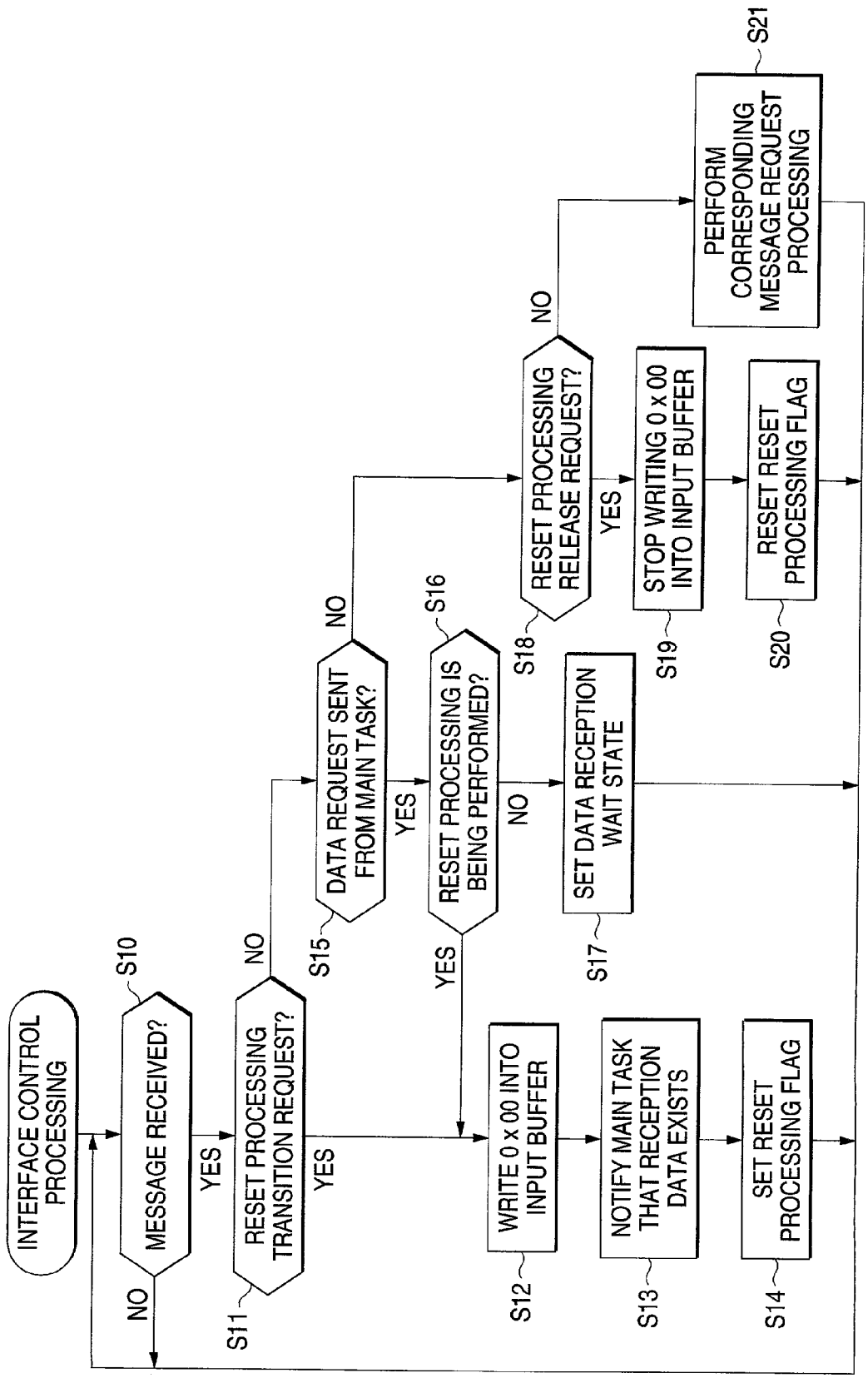
FIG. 3 is a flowchart to describe the contents of interface control processing (interface control task) according to the first embodiment of the invention.

FIG. 3 is a flowchart to describe interface control processing performed in the interface control task T10 described above. In the embodiment, the interface control processing is accomplished by the CPU 16 which executes an interface control program stored in the ROM 14 in the real-time OS.

As shown in FIG. 3, first the interface control task T10 determines whether or not some message is received (step S10). If no message is received (NO at step S10), step S10 is repeated.

If some message is received (YES at step S10), the interface control task T10 determines whether or not the message is a reset processing transition request transmitted from the job control task T40 (step S11). If the received message is a reset processing transition request (YES at step S11), the interface control task T10 writes 0x00 into all area of the input buffer (step S12).

Next, the interface control task T10 notifies the main task T30 that reception data has been stored in the input buffer (step S13). This notification is transmitted through the reception data management task to the main task T30, as described above.

Next, the interface control task T10 sets a reset processing flag WSF (step S14). This reset processing flag WSF is a flag for the interface control task T10 to know whether the printer section is in the reset processing mode or the normal print data reception mode at present. The interface control task T10 returns to step S10.

On the other hand, if it is determined at step S11 that the received message is not a reset processing transition request (NO at step S11), whether or not the received message is a print data request sent from the main task T30 is determined (step T15). The message is received through the reception data management task from the main task T30, as described above.

If the received message is a print data request (YES at step S15), the interface control task T10 checks the reset processing flag WSF to see if reset processing is being performed at present (step S16). If reset processing is not being performed (NO at step S16), the interface control task T10 sets the fact that the main task T30 waits for receiving print data (step S17) and returns to step S10.

On the other hand, it is determined at step S16 that reset processing is being performed at present (YES at step S16), processing starting at step S12 is executed for writing 0x00 into the input buffer.

In contrast, if it is determined at step S15 that the received message is not a print data request sent from the main task T30 (NO at step S15), whether or not the received message is a reset processing release request sent from the job control task T40 is determined (step S18). If the received message is a reset processing release request (YES at step S18), the interface control task T10 stops writing 0x00 into the input buffer (step S19). Subsequently, the interface control task T10 resets the reset processing flag WSF (step S20) and returns to step S10.

On the other hand, if it is determined at step S18 that the received message is not a reset processing release request (NO at step S18), necessary processing for the corresponding message is performed (step S21). For example, if a control command such as a printer section reset command from the computer is received as described above, the command is transferred to the control command interpretation task T20. For example, if a request for a reply to a printer section reset command is received from the control command interpretation task T20, the reply is transferred to the computer. Then, the interface control task T10 returns to step S10.

Figure 4:
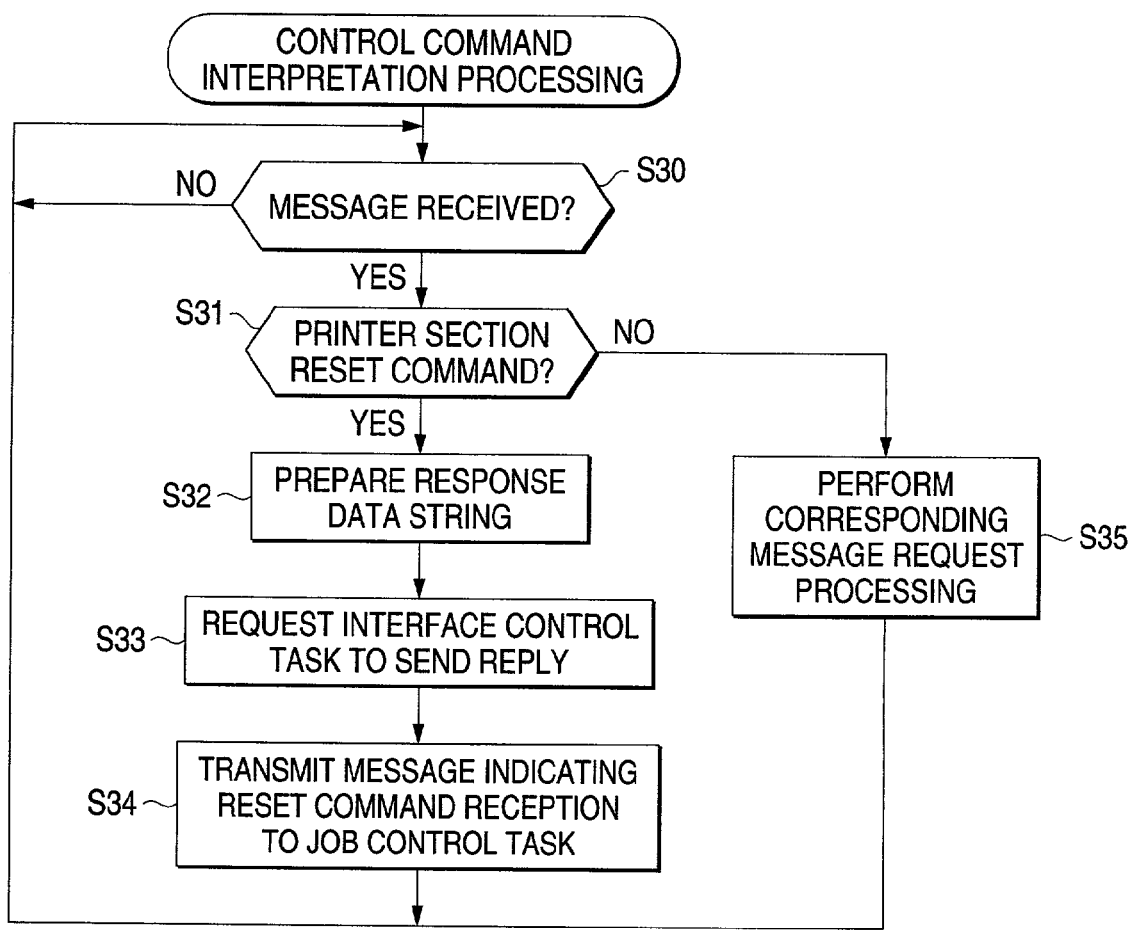
FIG. 4 is a flowchart to describe the contents of control command interpretation processing (control command interpretation task) according to the first embodiment of the invention.

Next, the control command interpretation task T20 will be discussed with reference to FIG. 4. FIG. 4 is a flowchart to describe control command interpretation processing performed in the control command interpretation task T20 described above. In the embodiment, the control command interpretation processing is accomplished by the CPU 16 which executes a control command interpretation program stored in the ROM 14 in the real-time OS.

As shown in FIG. 4, first the control command interpretation task T20 determines whether or not some message is received (step S30). If no message is received (NO at step S30), step S30 is repeated.

If some message is received (YES at step S30), the control command interpretation task T20 determines whether or not the message is a printer section reset command transmitted from the computer through the interface control task T10 (step S31). If the received message is a printer section reset command (YES at step S31), the control command interpretation task T20 prepares a response data string to the computer (step S32) and transmits the response data string to the interface control task T10 and requests the interface control task T10 to send a reply to the computer (step S33).

Next, the control command interpretation task T20 transmits a message indicating reset command reception to the job control task T40 (step S34). Then, it returns to step S30.

On the other hand, if it is determined at step S31 that the received message is not a printer section reset command (NO at step S31), the message is interpreted as required and necessary processing is performed (step S35). For example, if the message is a paper feed request message, the message is interpreted and necessary message is transmitted to job control task T40, etc. Then, the control command interpretation task T20 returns to step S30.

Figure 5:
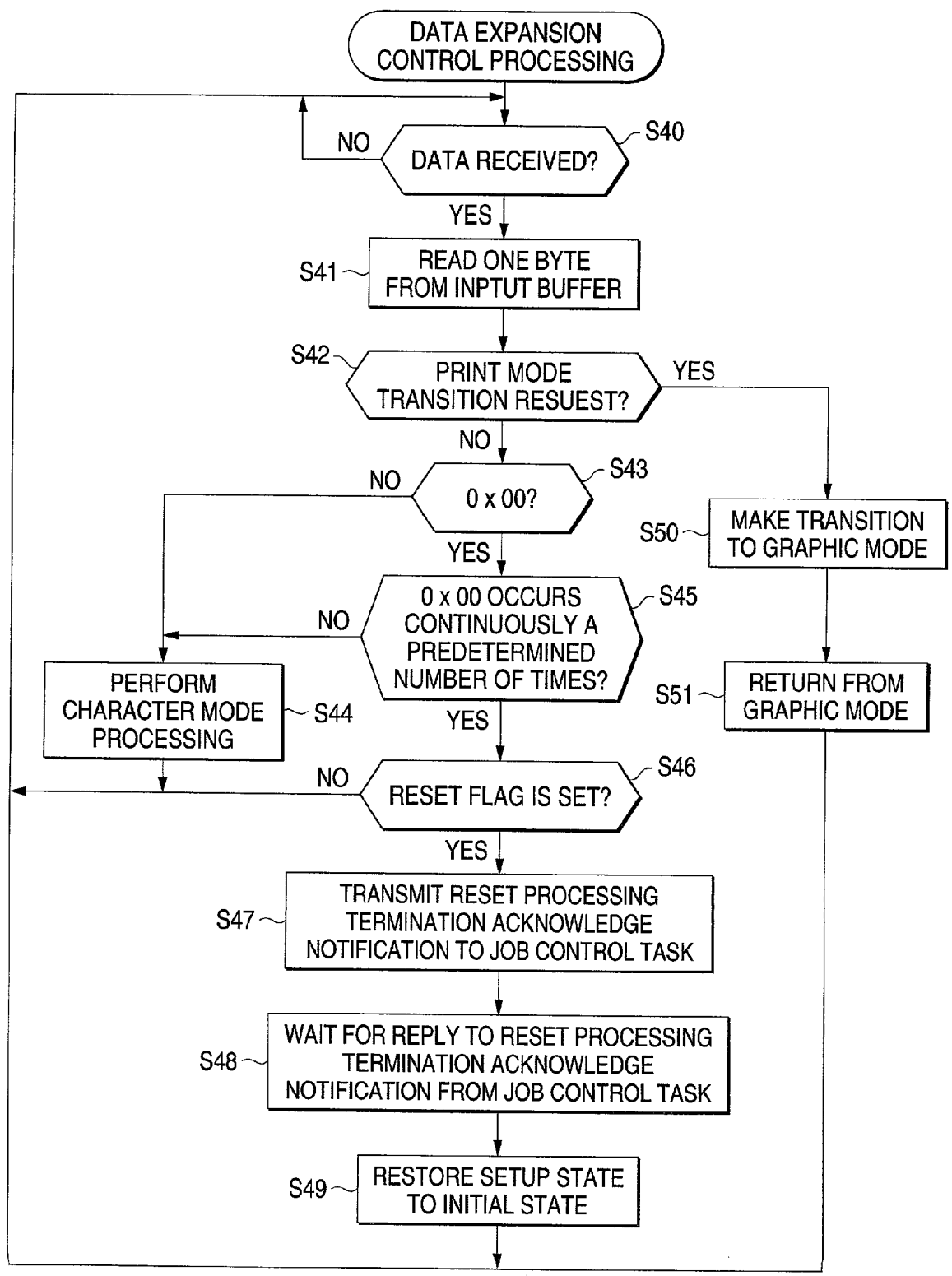
FIG. 5 is a flowchart to describe the contents of data expansion control processing (main task) according to the first embodiment of the invention.
Figure 6:
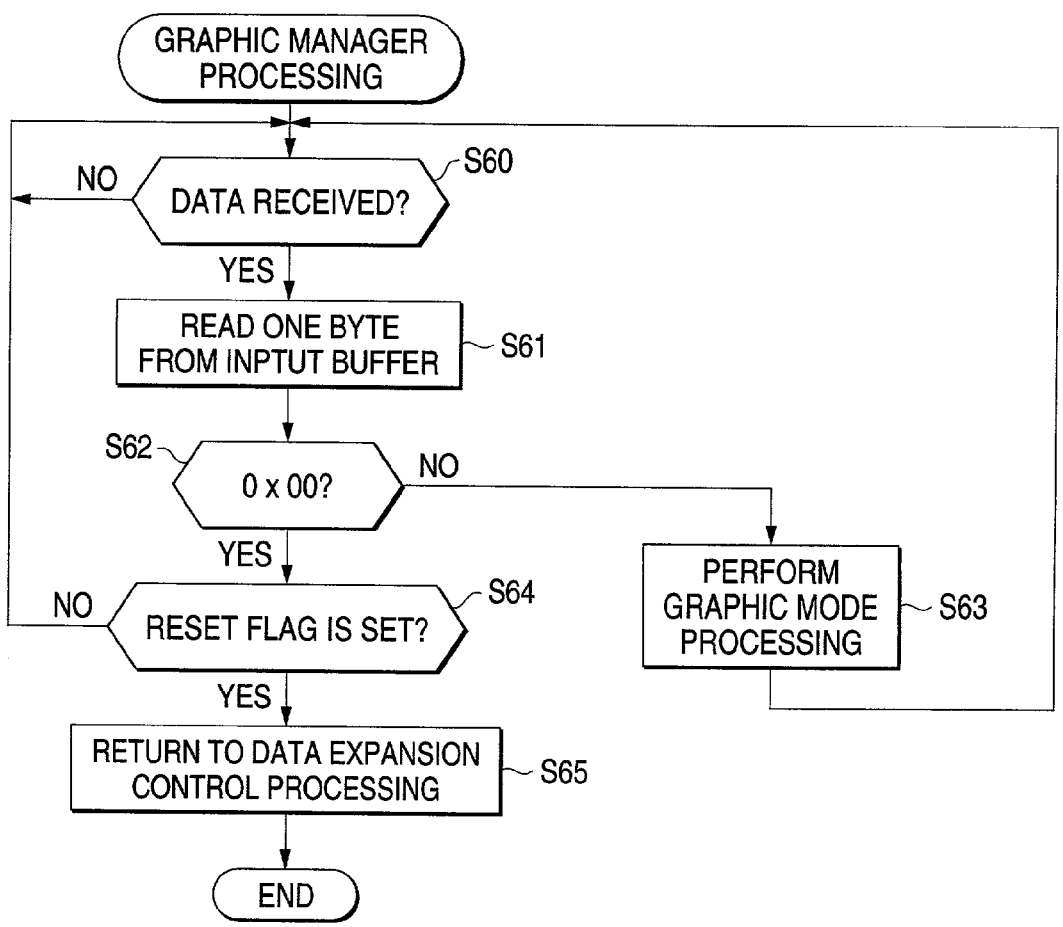
FIG. 6 is a flowchart to describe the contents of graphic manager processing (main task) according to the first embodiment of the invention.

Next, the main task T30 will be discussed with reference to FIGS. 5 and 6. FIG. 5 is a flowchart to describe data expansion control processing performed in the main task T30 described above; it indicates main loop processing in the embodiment. FIG. 6 is a flowchart to describe graphic manager processing of low-order loop processing deriving from the data expansion control processing. The main task T30 in the embodiment contains a large number of low-order loop processes in addition to the graphic manager processing; here, the graphic manager processing will be discussed as a representative example. Another low-order loop process also derives from one low-order loop process. This means that the loop processes of the main task T30 are nested in the embodiment.

The data expansion control processing in FIG. 5 is a character-based print data processing mode and the graphic manager processing in FIG. 6 is graphic-based print data processing mode. In the embodiment, the data expansion control processing and the graphic manager processing are accomplished by the CPU 16 which executes a data expansion control program and a graphic manager program stored in the ROM 14 in the real-time OS.

As shown in FIG. 5, first the main task T30 determines whether or not data is received in the input buffer (step S40). If no data is received (NO at step S40), step S40 is repeated.

If data is received in the input buffer (YES at step S40), the main task T30 reads one byte of the data from the input buffer (step S41). Next, it determines whether or not the data is a print mode transition request (step S42). The multifunction printer 10 according to the embodiment comprises the character mode for printing character-based print data and the graphic mode for printing graphic-based print data, and the mode is switched between the character mode and the graphic mode upon reception of a print mode transition request.

If the data is not a print mode transition request (NO at step S42), whether or not the acquired data is 0x00 is determined (step S43). If the acquired data is not 0x00 (NO at step S43), normal print is possible and thus normal processing in the character mode is executed (step S44). Then, the main task T30 returns to step S40.

On the other hand, if the acquired data is 0x00 (YES at step S43), whether or not 0x00 occurs continuously a predetermined number of times or more (for example, 1024 times=1 KB) is determined (step S45). The reason why whether or not 0x00 occurs continuously a predetermined number of times or more is checked is that if the reset flag RSF is checked for each byte in the character mode, the throughput in the normal character print is degraded and thus degradation of the throughput should be avoided. In other words, in the character print mode, 0x00 can be received as print data to no small extent. However, with some throughput degradation allowed, such a determination may be skipped.

Therefore, if 0x00 does not occur continuously a predetermined number of times or more (NO at step S45), the normal character mode processing described above is performed (step S44). On the other hand, if 0x00 occurs continuously a predetermined number of times or more (YES at step S45), whether or not the reset flag RSF is set is determined (step S46). Since the reset flag RSF is a flag managed by the job control task T40, the processing at step S46 takes longer processing time than flag check processing in the same task.

If the reset flag RSF is not set (NO at step S46), the main task T30 returns to step S40. On the other hand, if the reset flag RSF is set (YES at step S46), the main task T30 transmits a reset processing termination acknowledge notification to the job control task T40 (step S47), because the data expansion control processing is the highest-order loop processing in the embodiment.

Next, the main task T30 waits for a reply to the reset processing termination acknowledge notification from the job control task T40 (step S48). Upon reception of a reply, each setup state in the main task T30 is initialized (step S49) Accordingly, resetting of the main task T30 is complete and the main task T30 returns to step S40.

Next, the graphic manager processing shown in FIG. 6 will be discussed. The graphic manager processing is a loop applied when a transition is made to the graphic mode at step S50 shown in FIG. 5. Therefore, when the graphic manager processing terminates, control returns to step S51 in FIG. 5.

As shown in FIG. 6, in the graphic manager processing of the main task T30, first whether or not reception data exists in the input buffer is determined (step S60). If no reception data exist (NO at step S60), step S60 is repeated.

If reception data exists (YES at step S60), one-byte data is read from the input buffer (step S61). Next, the main task T30 determines whether or not the acquired data is 0x00 (step S62). If the acquired data is not 0x00 (NO at step S62), normal graphic mode processing is executed (step S63). Then, the main task T30 returns to step S60.

On the other hand, if the acquired data is 0x00 (YES at step S62), whether or not the reset flag RSF managed by the job control task T40 is set is determined (step S64). If the reset flag RSF is not set (NO at step S64), the main task T30 returns to step S60.

On the other hand, if the reset flag RSF is set (YES at step S64), the main task T30 returns from the graphic manager processing to the data expansion control processing in FIG. 5 (step S65).

In the graphic manager processing, whether or not 0x00 occurs continuously a predetermined number of times or more is not determined, because 0x00 is very scarcely received as print mode in the graphic mode and if the reset flag RSF is checked each time 0x00 is detected, it is not considered that the throughput is degraded. However, such a determination may be made.

In the embodiment, the data expansion control processing (main loop process) contains a large number of subordinate loop processes in addition to the graphic manager processing. Processing corresponding to steps S62 and S64 is also embedded in the subordinate loop processes. Loop processes may be furthermore nested. Also in this case, processing corresponding to steps S62 and S64 is embedded in each loop process. In this case, however, at step S65, the loop process returns to the immediately high-order loop process. Therefore, if the acquired data is 0x00 and the reset flag RSF is set, each loop process recognizes that reset processing is being performed, and returns to the immediately high-order loop process in order and finally arrives at the data expansion control processing in FIG. 5 of the highest-order loop process.

Figure 7:
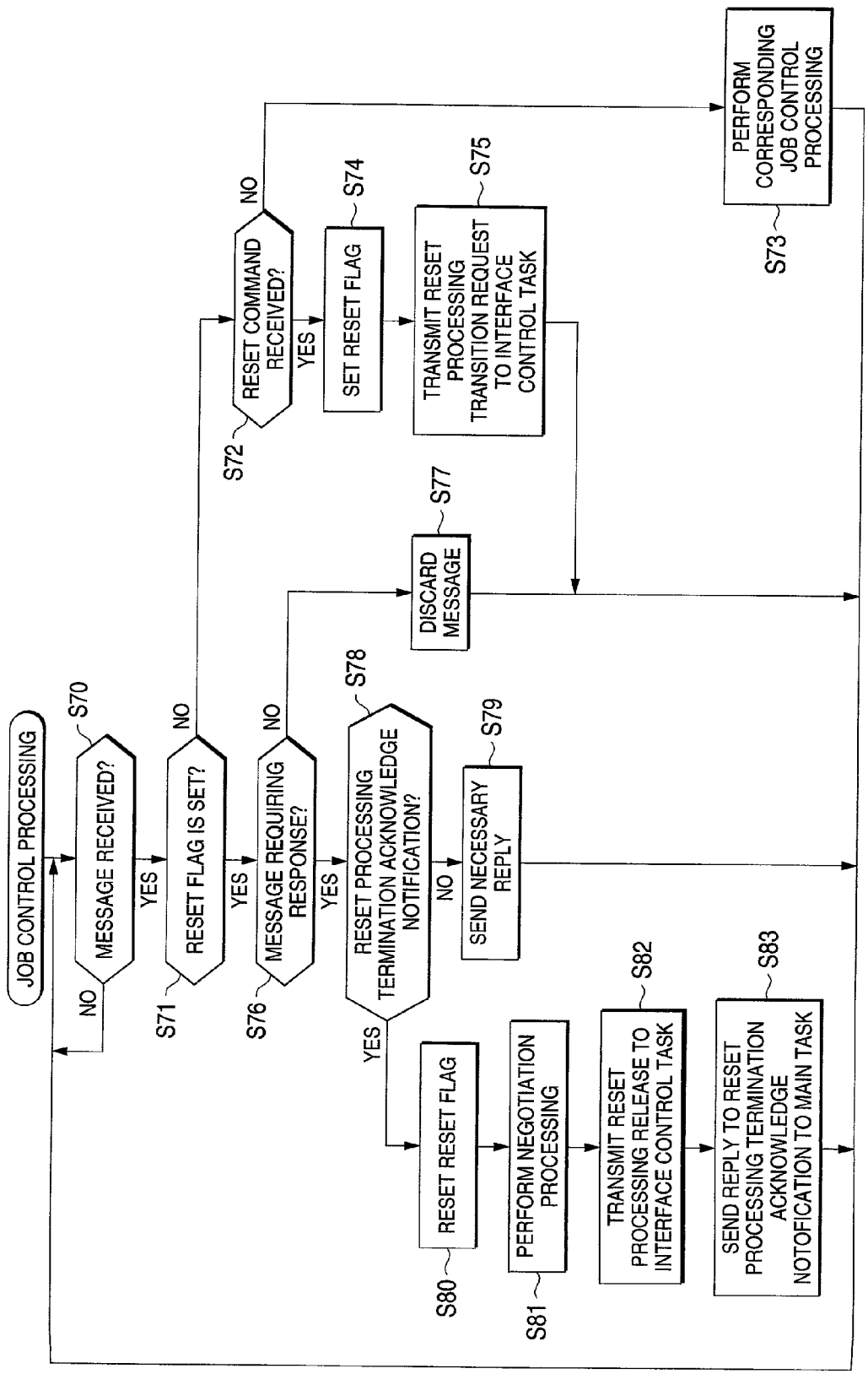
FIG. 7 is a flowchart to describe the contents of job control processing (job control task) according to the first embodiment of the invention.

Next, the job control task T40 will be discussed with reference to FIGS. 7 and 8. FIG. 7 is a flowchart to describe job control processing performed in the job control task T40 described above and FIG. 8 is a flowchart to describe negotiation processing of low-order loop processing of the job control processing.

In the embodiment, the job control processing and the negotiation processing are accomplished by the CPU 16 which executes a job control processing program and a negotiation program stored in the ROM 14 in the real-time OS.

As shown in FIG. 7, first the job control task T40 determines whether or not some message is received (step S70) If no message is received (NO at step S70), step S70 is repeated.

If some message is received (YES at step S70), the job control task T40 determines whether or not the reset flag RSF is set (step S71). If the reset flag RSF is not set (NO at step S71), the job control task T40 determines whether or not the received message is a reset command reception message transmitted from the control command interpretation task T20 (S72).

If the received message is not a reset command reception message (NO at step S72), the job control task T40 executes a job required for the received message and controls it (step S73). Then, the job control task T40 returns to step S70.

On the other hand, if the received message is a reset command reception message (YES at step S72), the job control task T40 sets the reset flag RSF (step S74). Subsequently, the job control task T40 transmits are set processing transition request to the interface control task T10 (step S75). Then, 5 the job control task T40 returns to step S70.

On the other hand, if it is determined at step S71 that the reset flag RSF is set (YES at step S71), whether or not the received message is a message requiring some response is determined (step S76). If the message does not require any response (NO at step S76), the job control task T40 discards the message (step S77). As the message is discarded, the corresponding job is discarded. Then, the job control task T40 returns to step S70.

On the other hand, if the received message is a message requiring some response (YES at step S76), the job control task T40 determines whether or not the message is a reset processing termination acknowledge notification from the main task T30 (step S78). If the received message is not a reset processing termination acknowledge notification (NO at step S78), it means that the main task T30 does not yet return to the highest-order loop processing and thus the job control task T40 sends a necessary reply to the received message for the present (step S79). Since there is a possibility that some low-order loop processing of the main task T30 may wait for a reply from the job control task T40, only the necessary reply needs to be made to terminate the loop processing and return control to the high-order loop processing. However, the job control task T40 skips the contents of the message. Then, it returns to step S70.

On the other hand, if the received message is a reset processing termination acknowledge notification from the main task T30 (YES at step S78), it means that the main task T30 returns to the highest-order loop and thus the job control task T40 resets the reset flag RSF (step S80). Subsequently, negotiation processing is performed (step S81). The detailed contents of the negotiation processing will be discussed later.

Next, the job control task T40 transmits are set processing release request to the interface control task T10 (step S82). Subsequently, the job control task T40 transmits a reply to the reset processing termination acknowledge notification to the main task T30 (step S83). Then, the job control task T40 returns to step S70.

Next, the negotiation processing at step S81 in FIG. 7 mentioned above will be discussed in detail with reference to FIG. 8.

Figure 8:
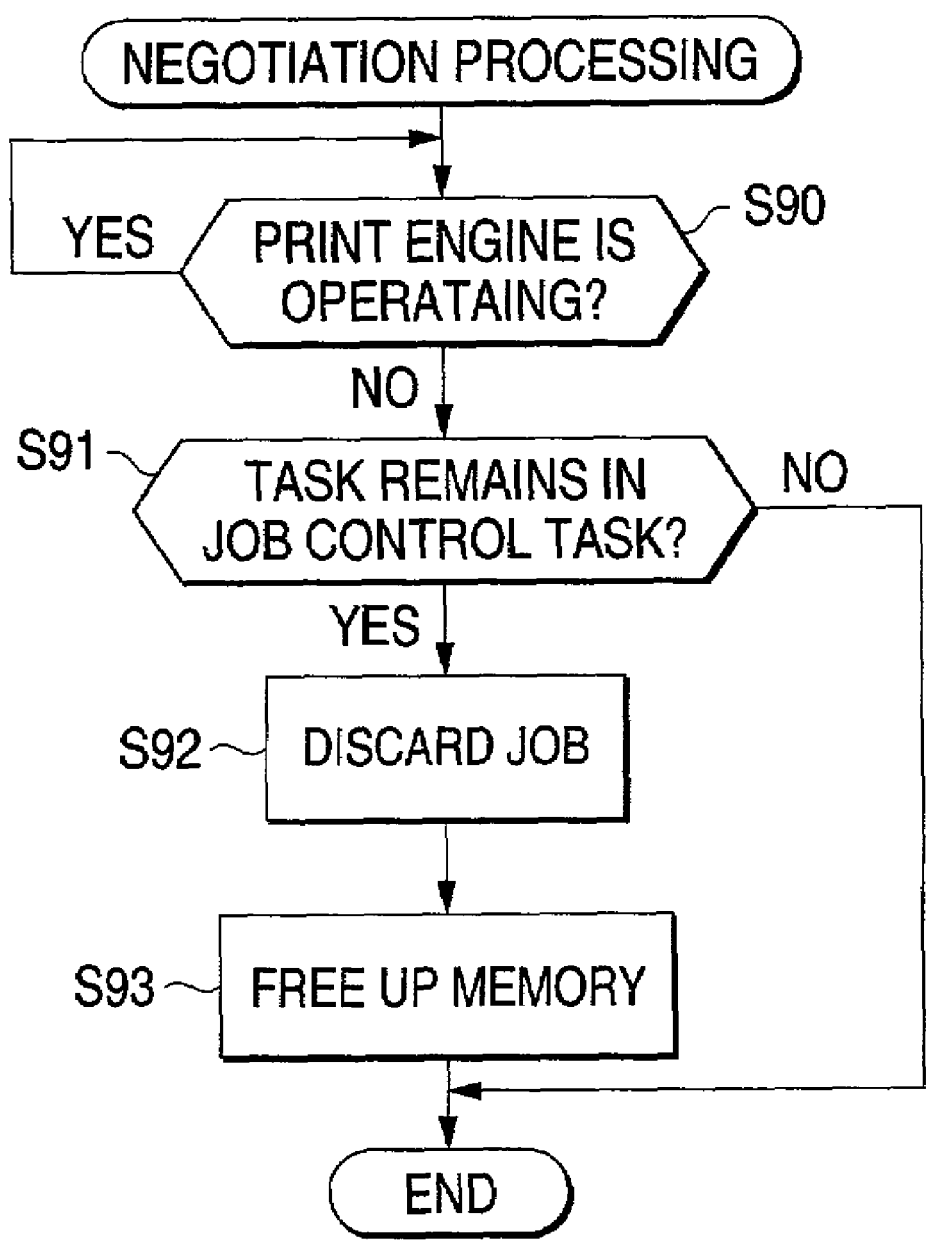
FIG. 8 is a flowchart to describe the contents of negotiation processing according to the first embodiment of the invention.

As shown in FIG. 8, first in the negotiation processing, whether or not the print engine 24 is operating is determined (step S90). If the print engine 24 is operating (YES at step S90), step S90 is repeated.

If the print engine 24 is not operating (NO at step S90), whether or not a task remains in the job control task T40 is determined (step S91) If no task remains in the job control task T40 (NO at step S91), the negotiation processing is terminated.

On the other hand, if a task remains in the job control task T40 (YES at step S91), the job is discarded (step S92) and the memory is also freed up (step S93). The negotiation processing is terminated.

As described above, according to the multifunction printer 10 according to the embodiment, even if the scanner section and the printer section operate concurrently, it is made possible to reset only the printer section, so that the convenience of the user is improved. That is, an accident can be circumvented in which when the scanner section and the printer section operate concurrently, if an attempt is made to reset the printer section, the scan operation of the scanner section is also stopped.

Specifically, upon reception of a printer section reset command, the interface control task T10 forcibly writes NULL data into the input buffer as print data and the job control task T40 sets the reset flag RSF indicating that reset processing is being performed. Thus, the main task T30 reading the print data from the input buffer and performing expansion processing can terminate the processing sometime. That is, if the main task T30 is made up of nested loop processes, when the main task T30 performs processing in order based on the NULL data and detects the reset flag RSF being set, it exits the low-order loop processes in order and makes the transition to the higher-order loop process and thus finally can autonomously return to the highest-order loop process.

Thus, the multifunction printer 10 according to the invention can be provided without largely changing the processing contents of already existing main task T30 made up of complicated loop processes.

A second embodiment of the invention is provided by modifying the first embodiment described above. That is, a low-order loop process started by a main task T30 is started according to a setup timer and after the expiration of a given time since starting the low-order loop process based on the timer, the low-order loop process is terminated in progress and control returns to the main process of the main task T30. Thus, it is made possible to reset only a print section of a multifunction printer 10 if an interface control task T10 does not write NULL. The second embodiment will be discussed in more detail below:

The multifunction printer 10 according to the embodiment has a similar internal configuration to that previously descried with reference to FIG. 1; however, the multifunction printers 10 according to the first and second embodiments differ in processing performed upon reception of a printer section reset command from a computer.

Figure 9:
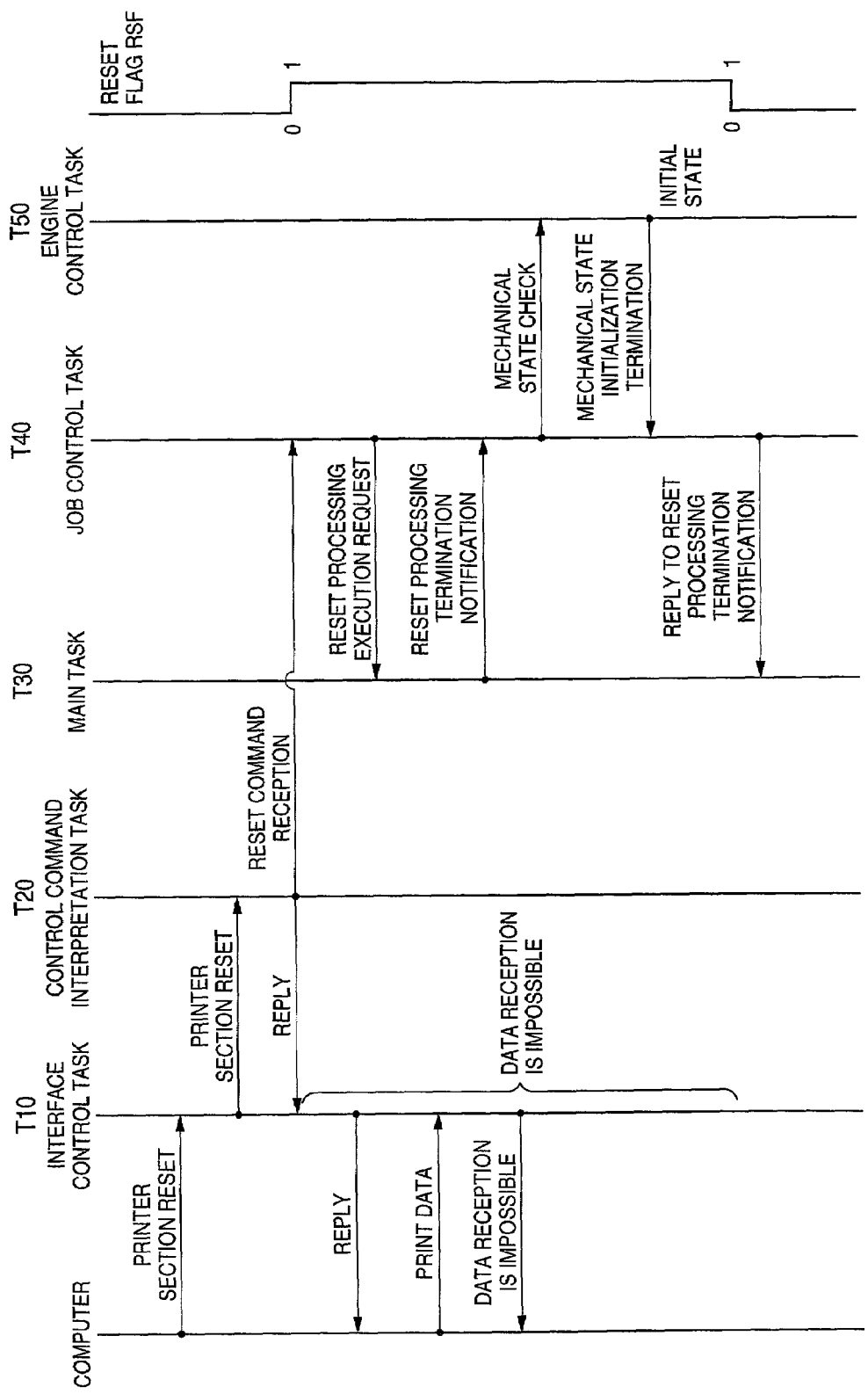
FIG. 9 is a timing chart to schematically describe processing of a multifunction printer according to a second embodiment of the invention upon reception of a printer section reset command from a computer.

FIG. 9 is a timing chart to schematically describe processing of the multifunction printer 10 upon reception of a printer section reset command. As compared with FIG. 2, an engine control task T50 is added to FIG. 9. However, the multifunction printer 10 according to the first embodiment also comprises the engine control task T50, which is not shown in FIG. 2.

As shown in FIG. 9, a printer section reset command transmitted from a computer is received by the interface control task T10. The interface control task T10 determines whether the received command is a control command or print data, etc. In this example, the received command is a control command and therefore the interface control task T10 transmits the command to a control command interpretation task T20 to request the control command interpretation task T20 to interpret the print section reset command.

Upon reception of the command, the control command interpretation task T20 interprets the command, whereby the received command is determined the print section reset command. Thus, the control command interpretation task T20 requests the interface control task T10 to send a reply. Based on the request, the interface control task T10 returns a reply to the computer. The control command interpretation task T20 transmits a reset command reception message to a job control task T40.

Upon reception of the reset command reception message, the job control task T40 sets a rest flag RSF and transmits a reset processing execution request to the main task T30. The job control task T40 discards the later jobs of print, paper feed request, etc., thoroughly. However, to a message requiring a response, only a necessary reply is made for the present.

Upon reception of the reset processing execution request, the main task T30 frees up the memory area reserved in RAM 12 for data expansion processing. The main task T30 transmits a reset processing termination notification to the job control task T40. In the embodiment, if a low-order loop process started from the main task T30 is executed, the low-order loop process is returned to the main process of the main task T30 after the expiration of a predetermined time based on the timer.

Upon reception of the reset processing termination notification, the job control task T40 transmits a mechanical state check message to the engine control task T50 to initialize the mechanical state of a print engine 24. Upon reception of the mechanical state check message, the engine control task T50 initializes the mechanical state of a print engine 24. Then, the engine control task T50 transmits a mechanical state initialization termination message to the job control task T40.

Upon reception of the mechanical state initialization termination message, the job control task T40 resets the reset flag RSF and sends a reply to the reset processing termination notification to the main task T30. Upon reception of the reply, the main task T30 restores each necessary setup state in the main task T30 to the initial state. Resetting only the printer section is now complete.

While the reset flag RSF is set (namely, in the example in FIG. 9, the reset flag RSF is "1"), if the interface control task T10 receives print data from the computer, it returns a message indicating that the data reception is impossible to the computer transmitting the print data. That is, print data is not accepted during the reset processing.

The processing of the multifunction printer 10 according to the embodiment upon reception of the printer section reset command has been schematically described. Next, the detailed processing contents of each of the tasks described above will be discussed.

Figure 10:
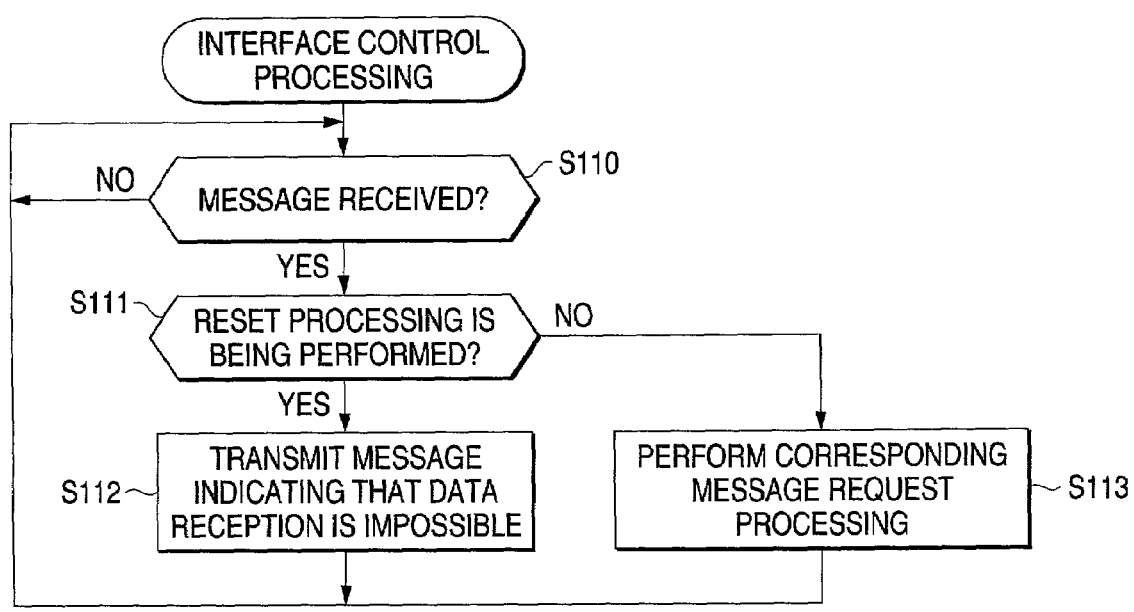
FIG. 10 is a flowchart to describe the contents of interface control processing (interface control task) according to the second embodiment of the invention.

FIG. 10 is a flowchart to describe interface control processing performed in the interface control task T10 described above. Also in the embodiment, the interface control processing is accomplished by a CPU 16 which executes an interface control program stored in the ROM 14 in the real-time OS.

As shown in FIG. 10, first the interface control task T10 determines whether or not some message is received (step S110). If no message is received (NO at step S110), step S110 is repeated.

If some message is received (YES at step S110), the interface control task T10 determines whether or not reset processing is being performed at present (step S111). Specifically, whether or not reset processing is being performed at present is determined based on whether or not the reset flag RSF is set. If reset processing is being performed (YES at step S111), the received message cannot be processed and therefore the interface control task T10 returns a message indicating that the data reception is impossible to the computer transmitting the message (step S112). Then, the interface control task T10 returns to step S110.

On the other hand, if it is determined at step S111 that reset processing is being performed (NO at step S111), necessary processing for the corresponding message is performed (step S113). For example, if a control command such as a printer section reset command from the computer is received as described above, the command is transferred to a control command interpretation task T20. For example, if a request for a reply to a printer section reset command is received from the control command interpretation task T20, the reply is transferred to the computer. Then, the interface control task T10 returns to step S110.

Processing of the control command interpretation task T20 according to the embodiment is similar to that previously described with reference to FIG. 4 in the first embodiment and therefore will not be discussed again.

Figure 11:
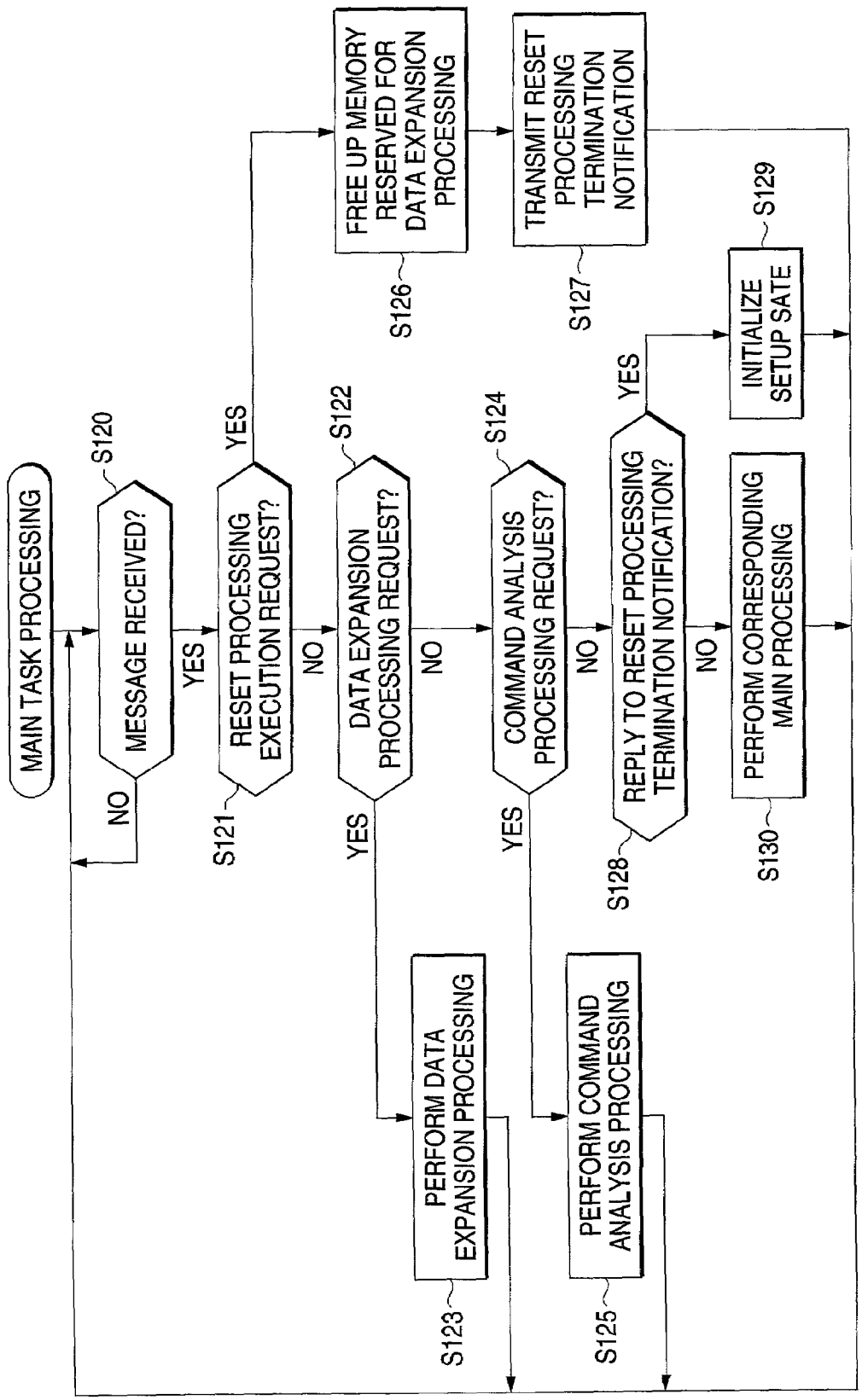
FIG. 11 is a flowchart to describe the contents of main task processing (main task) according to the second embodiment of the invention.
Figure 12:
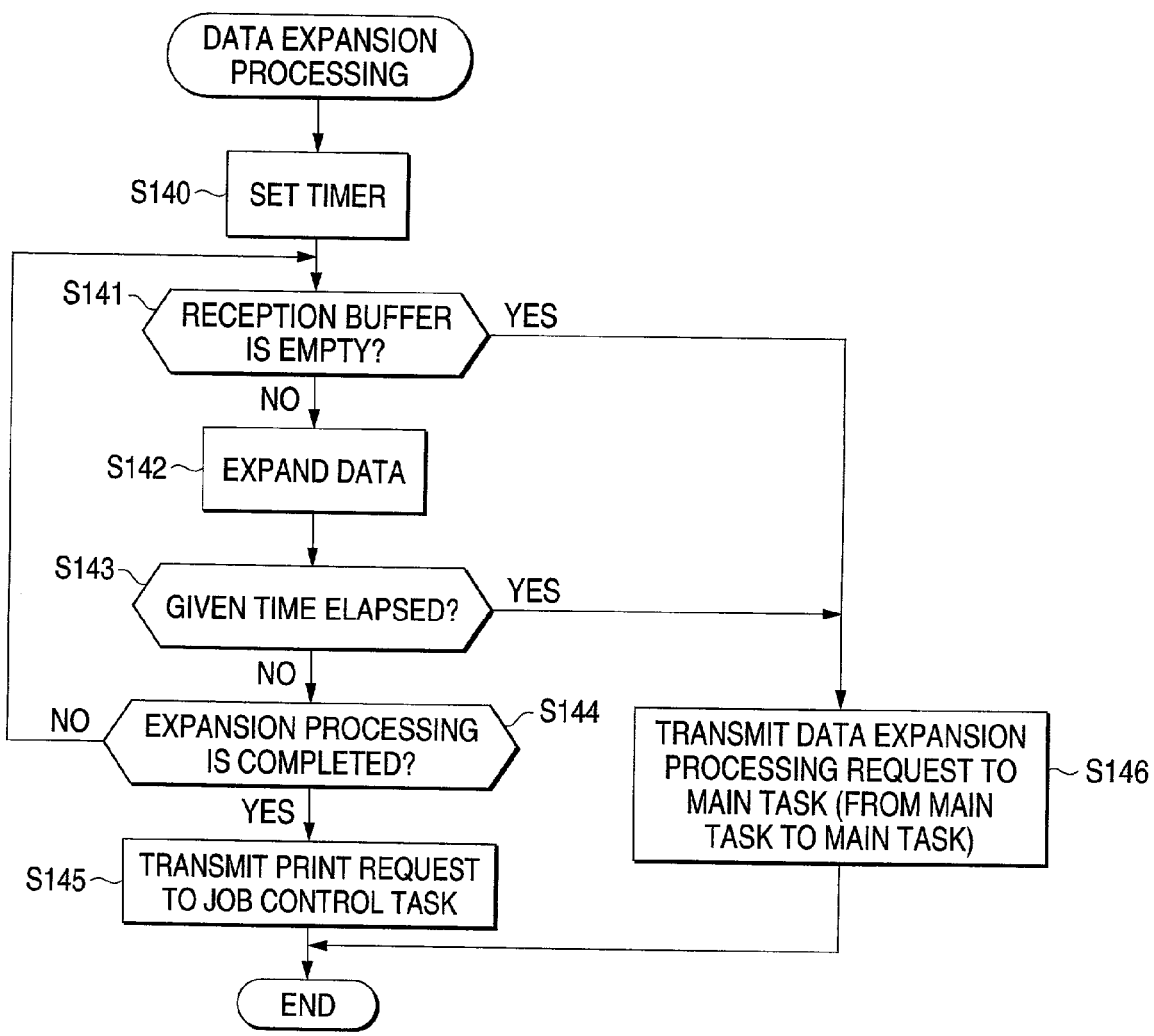
FIG. 12 is a flowchart to describe the contents of data expansion processing (main task) according to the second embodiment of the invention.

Next, the main task T30 will be discussed with reference to FIGS. 11 and 12. FIG. 11 is a flowchart to describe main task processing performed in the main task T30 described above; it indicates main loop processing in the embodiment. FIG. 12 is a flowchart to describe data expansion processing of low-order loop processing deriving from the main task processing. The main task T30 in the embodiment contains a large number of low-order loop processes in addition to the data expansion processing; here, the data expansion processing will be discussed as a representative example. Another low-order loop process also derives from one low-order loop process. This means that the loop processes of the main task T30 are nested in the embodiment.

Also in the embodiment, the main task processing and the data expansion processing are accomplished by the CPU 16 which executes a main task program and a data expansion control program stored in the ROM 14 in the real-time OS.

As shown in FIG. 11, first the main task T30 determines whether or not some message is received (step S120). If no message is received (NO at step S120), step S120 is repeated.

If some message is received (YES at step S120), the main task T30 determines whether or not the message is a reset processing execution request transmitted from the job control task T40 (step S121). If the received message is not a reset processing execution request (NO at step S121), the main task T30 determines whether or not the message is a data expansion processing request concerning print data (step S122).

If the received message is a data expansion processing request (YES at step S122), data expansion processing is performed for the print data (step S123). The data expansion processing is an example of a low-order process started from the main process and will be discussed later in detail with reference to FIG. 12. When the main task T30 returns from the data expansion processing to the main task process, it returns to step S120.

On the other hand, if it is determined at step S122 that the received message is not a data expansion processing request (NO at step S122), whether or not the received message is a command analysis processing request is determined (step S124). If the received message is a command analysis processing request (YES at step S124), command analysis processing is performed for the command (step S125). The contents of the command analysis processing will not be discussed here; the command analysis processing is also a low-order process started from the main task process in the embodiment. When the main task T30 returns from the command analysis processing to the main task process, it returns to step S120.

In contrast, if the main task T30 determines at step S121 that the received message is a reset processing execution request (YES at step S121), the main task T30 frees up the memory area reserved in the RAM 12 for the data expansion processing by the main task T30 (step S126) and terminates the data expansion processing in progress. Subsequently, the main task T30 transmits a reset processing termination notification to the job control task T40 (step S127). Then, the main task T30 returns to step S120.

On the other hand, it is determined at step S124 that the received message is not a command analysis processing request (NO at step S124), whether or not the received message is a reply to the reset processing termination notification transmitted from the job control task T40 is determined (step S128). As previously described with reference to FIG. 9, when the reset processing termination notification is transmitted to the job control task T40 at step S127, the job control task T40 sends a reply to the reset processing termination notification to the main task T30 at the stage of being ready for mechanically resetting the print engine 24.

If the received message is a reply to the reset processing termination notification (YES at step S128), each setup state in the main task T30 is initialized (step S129). On the other hand, if the received message is not a reply to the reset processing termination notification (NO at step S128), main processing corresponding to the message is performed (step S130) After steps S129 and S130, the main task T30 returns to step S120.

Next, the data expansion processing at step S123 will be discussed in detail with reference to FIG. 12. The data expansion processing is a low-order process when a transition is made to the data expansion processing at step S123 shown in FIG. 11 is made. Therefore, when the data expansion processing terminates, control returns to step S120 in FIG. 11.

As shown in FIG. 12, in the data expansion processing, first the timer is set (step S140). That is, the value of the timer is set to zero. Next, whether or not a reception buffer is empty is determined (step S141). If the reception buffer is not empty (NO at step S141), namely, if print data is stored in the reception buffer, the print data is expanded (step S142)

Whether or not a predetermined time has elapsed since the data expansion processing was started is determined (step S143). Specifically, the time elapsed since the data expansion processing was started is acquired based on the value of the timer started at step S140. Whether or not the acquired time is greater than the predetermined time (for example, one second) is determined.

If the predetermined time has not elapsed since the data expansion processing was started (NO at step S143), whether or not the data expansion processing has been performed to the end of data is determined (step S144). If the data expansion processing has not yet been performed to the end of data (NO at step S144), control returns to step S141. On the other hand, if the data expansion processing has been performed to the end of data (YES at step S144), a print request for the expanded print job data is transmitted to the job control task T40 to print the data in the print engine 24 (step S145). Then, the data expansion processing is terminated.

If it is determined at step S141 that the reception buffer is empty (YES at step S141) or if it is determined at step S143 that the predetermined time has elapsed since the data expansion processing was started (YES at step S143), a data expansion processing request is transmitted to the main task T30 (step S146) and then the data expansion processing is terminated. That is, the processing start request is transmitted from the main task T30 to the main task T30, whereby the data expansion processing is started again after control once returns to the main process of the main task T30.

Next, job control processing performed in the job control task T40 will be discussed with reference to FIG. 13. Also in the embodiment, the job control processing is accomplished by the CPU 16 which executes a job control processing program stored in the ROM 14 in the real-time OS.

Figure 13:
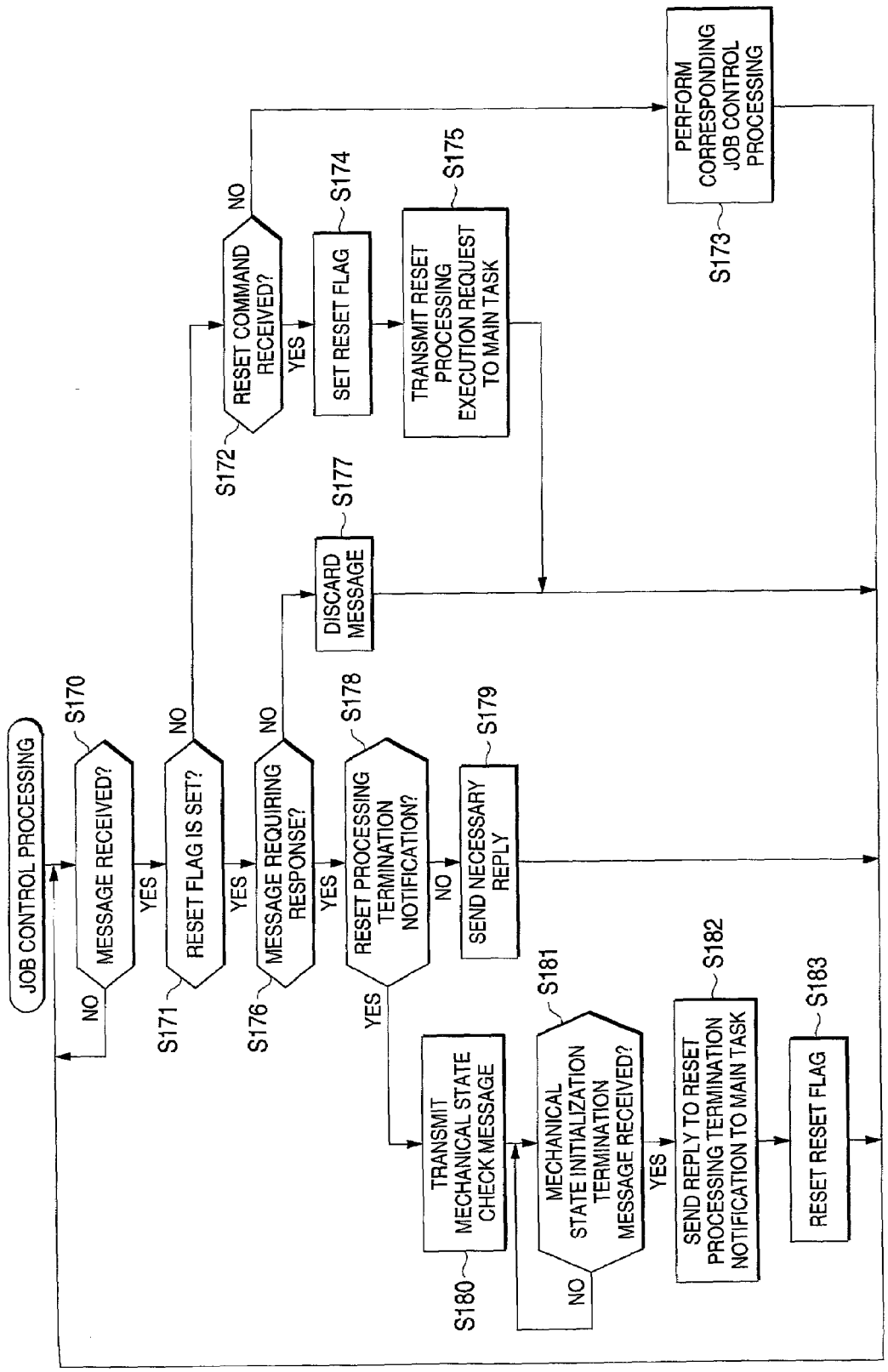
FIG. 13 is a flowchart to describe the contents of job control processing (job control task) according to the second embodiment of the invention.

As shown in FIG. 13, first the job control task T40 determines whether or not some message is received (step S170). If no message is received (NO at step S170), step S170 is repeated.

If some message is received (YES at step S170), the job control task T40 determines whether or not the reset flag RSF is set (step S171). If the reset flag RSF is not set (NO at step S171), the job control task T40 determines whether or not the received message is a reset command reception message transmitted from the control command interpretation task T20 (S172).

If the received message is not a reset command reception message (NO at step S172), the job control task T40 executes a job required for the received message and controls it (step S173). Then, the job control task T40 returns to step S170.

On the other hand, if the received message is a reset command reception message (YES at step S172), the job control task T40 sets the reset flag RSF (step S174). Subsequently, the job control task T40 transmits a reset processing execution request to the main task T10 (step S175). Then, the job control task T40 returns to step S170.

On the other hand, if it is determined at step S171 that the reset flag RSF is set (YES at step S171), whether or not the received message is a message requiring some response is determined (step S176). If the message does not require any response (NO at step S176), the job control task T40 discards the message (step S177). As the message is discarded, the corresponding job is discarded. Then, the job control task T40 returns to step S170.

On the other hand, if the received message is a message requiring some response (YES at step S176), the job control task T40 determines whether or not the message is a reset processing termination notification from the main task T30 (step S178). If the received message is not a reset processing termination notification (NO at step S178), it means that the main task T30 does not yet return to the highest-order loop processing and thus the job control task T40 sends a necessary reply to the received message for the present (step S179). Since there is a possibility that some low-order loop processing of the main task T30 may wait for a reply from the job control task T40, only the necessary reply needs to be made to advance the loop processing. However, the job control task T40 skips the contents of the message. Then, it returns to step S170.

On the other hand, if the received message is a reset processing termination notification from the main task T30 (YES at step S178), it means that the main task T30 returns to the highest-order loop and frees up the reserved memory area and thus the job control task T40 transmits a mechanical state check message to the engine control task T50 (S180). Upon reception of the mechanical state check message, the engine control task T50 initializes the mechanical state of the print engine 24 and then transmits a mechanical state initialization termination message to the job control task T40.

Thus, after transmitting the mechanical state check message at step S180, the job control task T40 waits until reception of the mechanical state initialization termination message (step S181). Upon reception of the mechanical state initialization termination message (YES at step S181), the job control task T40 sends a reply to the reset processing termination notification to the main task T30 (step S183).

Resetting the printer section is now complete. Then, the job control task T40 resets the reset flag RSF (step S183). Specifically, it sets the reset flag RSF to "0." Then, the job control task T40 returns to step S170.

As described above, according to the multifunction printer 10 according to the embodiment, even if the scanner section and the printer section operate concurrently, it is made possible to reset only the printer section, so that the convenience of the user is improved. That is, an accident can be circumvented in which when the scanner section and the printer section operate concurrently, if an attempt is made to reset the printer section, the scan operation of the scanner section is also stopped.

Specifically, upon reception of a printer section reset command, a reset processing execution request is transmitted to the main task T30. Upon reception of the reset processing execution request, the main task T30 frees up the memory area reserved for the data expansion processing and terminates the data expansion processing in progress. If a low-order loop process is started from the main process of the main task T30, the low-order loop process is designed so as to once return to the main process after the expiration of the predetermined time if it is being performed. Thus, even if a low-order loop process is executed in the processing of the main task T30, if the main task T30 receives the reset processing execution request, the data expansion processing can be terminated.

The invention is not limited to the embodiments described above and various modifications can be made. For example, in the data expansion control processing and the graphic manager processing previously described with reference to FIGS. 5 and 6 in the first embodiment, whether or not the data read from the input buffer is 0x00 is determined at steps S43 and S62 before whether or not the reset flag RSF is set is determined, but steps S43 and S62 may be skipped and whether or not the reset flag RSF is set may be determined directly.

The processing classification of the tasks in the first and second embodiments described above is not limited to that described above and a plurality of tasks may be combined into one task or one task may be divided into a plurality of tasks.

Further, in the interface control task T10 in the first embodiment described above, the reset processing flag WSF indicating that the printer section is being reset is provided aside from the reset flag RSF, but only the rest flag RSF may be provided without providing the additional reset processing flag WSF.

In the second embodiment described above, the main task T30 transmits the message to initialize the print engine 24 to the engine control task T50 through the job control task T40, but the message may be transmitted directly. That is, after the mechanical state check message is transmitted from the main task T30 to the engine control task T50 and the engine control task T50 initializes the mechanical state of the print engine 24, the mechanical state initialization termination message may be transmitted from the engine control task T50 to the main task T30.

Further, in the first and second embodiments described above, the printer section reset command is transmitted from the computer to the multifunction printer 10, but how to reset the printer section in the multifunction printer 10 is not limited to the mode. For example, the main unit of the multifunction printer 10 may be provided with a reset button and when the user operates the reset button, the printer section reset command may be generated in the multifunction printer 10 for input to the interface control task T10.

As for the task processing of the interface control task T10, the control command interpretation task T20, the main task T30, the job control task T40, the engine control task T50, etc., described in the embodiments, a program to execute the processing can be recorded on a record medium such as a floppy disk, a CD-ROM (compact disc-read-only memory), ROM, or a memory card for distribution in the form of the record medium. In this case, the program recorded on the record medium is read into the multifunction printer 10 and is executed, whereby the embodiment described above can be realized.

The multifunction printer 10 may comprise programs of the operating system, other application programs, etc. In this case, to make the most of other programs contained in the multifunction printer 10, an instruction to call a program for accomplishing similar processing to that of the above-described embodiment from among the programs contained in the multifunction printer 10 may be recorded on a record medium.

Further, such a program can also be distributed as a carrier through a network rather than in the form of the record medium. The program transmitted in the form of the carrier on the network is read into the multifunction printer 10 and is executed, whereby the embodiment described above can be realized.

To record a program on a record medium or transmit a program as a carrier on the network, the program may be encrypted or compressed. In this case, the multifunction printer 10 reading the program from the record medium or the carrier needs to decrypt or decompress the program before executing the program.

As described above, according to the invention, in the multifunction printer having the scanner section and the printer section, even if the scanner section is operating, only the printer section can be reset, so that the convenience of the user is improved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A multifunction printer comprising:
   a scanner section;
   a printer section;
   reset means for resetting only the printer section even if the scanner section is operating; and
   a central processing unit that executes a real-time operating system (OS) of the multifunction printer and tasks running on the real-time OS,
   wherein the reset means causes a task related to a printing operation and running on the real-time OS to exit a processing being performed during a printer section resetting by said reset means, and cancels the printing operation without rebooting the real-time operation of the OS.

2. A multifunction printer according to claim 1, further comprising reception means for receiving a printer section reset command for resetting the printer section, wherein upon reception of the printer section reset command, the reset means resets only the printer section.

3. A multifunction printer according to claim 1, wherein said central processing unit is the only central processing unit of said multifunction printer.

4. A multifunction printer according to claim 2, further comprising:
   data expansion processing means for expanding received print data, wherein when the reset means receives the printer section reset command, the data expansion processing means terminates expanding the print data in progress; and
   low-order processing means being started by the data expansion processing means, wherein when a predetermined time has elapsed since the low-order processing means was started, the low-order processing means returns to the data expansion processing means if the processing does not terminate.

5. A multifunction printer according to claim 4, further comprising print engine initialization means for restoring a print engine to an initial state if expanding the print data by the data expansion processing means terminates in progress.

6. A multifunction printer according to claim 5, wherein after the print engine initialization means restores the print engine to the initial state, the setup state of the data expansion processing means is restored to the initial state.

7. A multifunction printer comprising a scanner section, a printer section, reset means for resetting only the printer section even if the scanner section is operating, and only one central processing unit;
   wherein the reset means is realized by the central processing unit which executes at least
   a first task, upon reception of the printer section reset command, for writing dummy data interpreted as insignificant data as print data into an input buffer for storing print data transmitted from a computer as print data; and
   a second task for reading the print data stored in the input buffer and expanding the data into image data.

8. A multifunction printer according to claim 7, wherein the reset means further comprises as a task executed by the central processing unit:
   a third task, upon reception of the printer section reset command, for setting reset identification information indicating that the printer section is being reset.

9. A multifunction printer according to claim 8, wherein the second task has a highest-order main loop process and a low-order loop process deriving in a nested loop manner from the main loop process, and wherein when the reset identification information is set, the low-order loop process exits the process and returns to the high-order loop process.

10. A multifunction printer according to claim 9, wherein when the current mode is a character mode for printing character data, the second task performs processing for determining whether or not the dummy data occurs continuously a predetermined number of times or more, and wherein when the current mode is a graphic mode for printing graphic data, the second task skips the determination processing.

11. A control method of a multifunction printer having a scanner section, a printer section, and a central processing unit that executes a real-time operating system (OS) of the multifunction printer and tasks running on the real-time OS, comprising the steps of:
   resetting only the printer section, even if the scanner section is operating; and
   during said resetting step, causing a task related to a printing operation and running on the real-time OS to exit a processing being performed, and canceling the printing operation without rebooting the real-time operation of the OS.

12. A program for causing a multifunction printer having a scanner section, a printer section, and a central processing unit, wherein the program is executable by the central processing unit and, when executed, causes the central processing unit to execute a reset step of resetting only the printer section even if the scanner section is operating, including causing a task related to a printing operation and running on a real-time OS executed by the central processing unit, to exit a processing being performed, and canceling the printing operation without rebooting the real-time operation of the OS.

13. A record medium storing a program for causing a multifunction printer having a scanner section, a printer section, and a central processing unit, wherein the program is executable by the central processing unit and, when executed, causes the central processing unit to execute a reset step of resetting only the printer section even if the scanner section is operating, including causing a task related to a printing operation and running on a real-time OS executed by the central processing unit, to exit a processing being performed, and canceling the printing operation without rebooting the real-time operation of the OS.

* * * * *